(12) United States Patent
Krivokapic

(10) Patent No.: US 6,980,613 B2
(45) Date of Patent: Dec. 27, 2005

(54) ULTRA-WIDEBAND CORRELATING RECEIVER

(75) Inventor: Ivan Krivokapic, San Diego, CA (US)

(73) Assignee: Pulse-LINK, Inc., Carlsbad, CA (US)

(*) Notice: Subject to any disclaimer, the term of this patent is extended or adjusted under 35 U.S.C. 154(b) by 49 days.

(21) Appl. No.: 10/718,984

(22) Filed: Nov. 21, 2003

(65) Prior Publication Data

US 2005/0069059 A1 Mar. 31, 2005

Related U.S. Application Data

(63) Continuation-in-part of application No. 10/676,449, filed on Sep. 30, 2003.

(51) Int. Cl.[7] .............................. H03D 1/04; H03D 1/06
(52) U.S. Cl. ...................................... 375/346; 375/316
(58) Field of Search ................................ 375/343, 346, 375/239, 359, 340

(56) References Cited

U.S. PATENT DOCUMENTS

| | | | |
|---|---|---|---|
| 3,728,632 A | | 4/1973 | Ross |
| 3,835,393 A | * | 9/1974 | Marron ........................ 725/124 |
| 3,906,453 A | * | 9/1975 | Mattedi et al. .............. 711/107 |
| 4,626,858 A | * | 12/1986 | Copeland .................... 342/374 |
| 4,641,317 A | | 2/1987 | Fullerton |
| 4,813,057 A | | 3/1989 | Fullerton |
| 4,846,920 A | * | 7/1989 | Keller et al. ............ 156/345.25 |
| 4,979,186 A | | 12/1990 | Fullerton |
| 5,210,772 A | * | 5/1993 | Nakagawa ................... 375/139 |
| 5,212,827 A | * | 5/1993 | Meszko et al. .............. 455/219 |
| 5,640,417 A | * | 6/1997 | Barabash et al. ............ 375/222 |
| 5,677,927 A | | 10/1997 | Fullerton et al. |
| 5,692,019 A | * | 11/1997 | Chang et al. ................ 375/347 |
| 5,854,593 A | * | 12/1998 | Dykema et al. ........ 340/825.22 |
| 5,973,494 A | * | 10/1999 | Masreliez et al. ..... 324/207.24 |
| 6,378,080 B1 | * | 4/2002 | Anjo et al. .................. 713/500 |

(Continued)

FOREIGN PATENT DOCUMENTS

| | | | |
|---|---|---|---|
| SU | 1396103 A | * 5/1988 | ........... G01S 13/86 |
| WO | WO 01/73965 A2 | 10/2001 | |
| WO | WO 01/76086 A2 | 10/2001 | |
| WO | WO 01/93446 A2 | 12/2001 | |

OTHER PUBLICATIONS

Moe Z. Win, Robert A. Scholtz, "Energy Capture vs. Correlator Resources in Ultra-Wide Bandwidth Indoor Wireless Communications Channels," Communication Sciences Institute, Department of Electrical Engineering-Systems, University of Southern California, Los Angeles, CA 90089-2565 USA.

(Continued)

*Primary Examiner*—Stephen Chin
*Assistant Examiner*—Jia Lu
(74) *Attorney, Agent, or Firm*—Pulse-LINK, Inc.; Peter R Martinez; Steve A Moore

(57) ABSTRACT

A receiver for ultra-wideband communications is provided. One feature of the receiver architecture is that includes only a single correlator. The receiver may be used in wireless and wire communication mediums. The single correlator may be used to update a locally generated signal based on an incoming signal and detect data. Another embodiment receiver may be used in a multi-path environment. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

1 Claim, 15 Drawing Sheets

U.S. PATENT DOCUMENTS

| | | |
|---|---|---|
| 6,505,032 B1 | 1/2003 | McCorkle et al. |
| 6,529,568 B1 * | 3/2003 | Richards et al. ............ 375/346 |
| 2003/0054764 A1 | 3/2003 | McCorkle et al. |
| 2003/0096578 A1 | 5/2003 | McCorkle et al. |

OTHER PUBLICATIONS

V. Srinivasa Somayazulu, Jeffrey R. Foerster and Sumit Roy, "Design Challenges for Very High Data Rate UWB Systems," Intel Labs., 2111 N.E. 25th Ave., Hillsboro, OR 97124-5961 USA.

Robert Fleming, Cherie Kusher, "Integrated, Low-Power, Ultra-Wideband Transceivers for Distributed Position Location and Communication", Semi-Annual Technical Report Contract J-BFI-94-058, Aether Wire & Location, Inc. Jul. 1995, Nicasio, CA, USA.

Robert Fleming, Cherie Kusher, "Low-Power, Miniature, Distributed Position Location and Communication Devices Using Ultra-Wideband, Nonsinusoidal Communication Technology", Semi-Annual Technical Report Contract J-BFI-94-058, Aether Wire & Location, Inc. Jul. 1995, Nicasio, CA, USA.

David G. Leeper, "Wireless Data Blaster", Scientific American, vol. 286, No. 5, May 2002, pp. 64-69, USA.

* cited by examiner

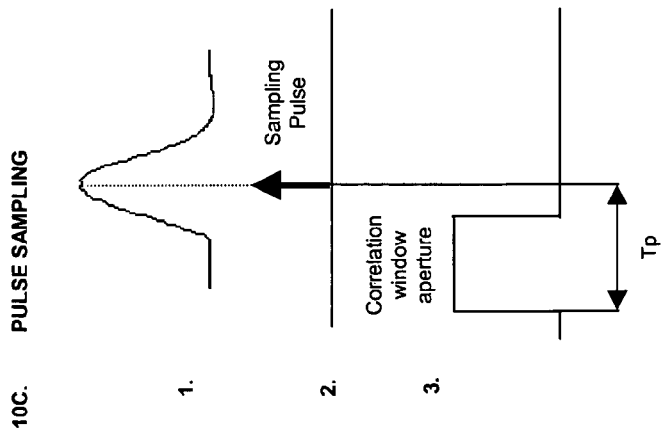
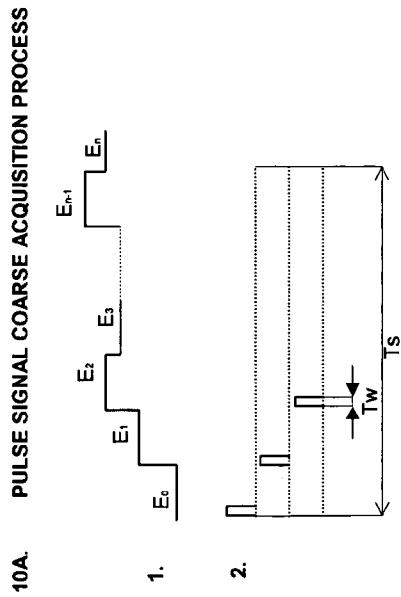
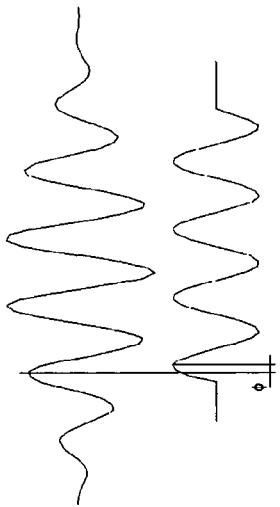
FIG. 10

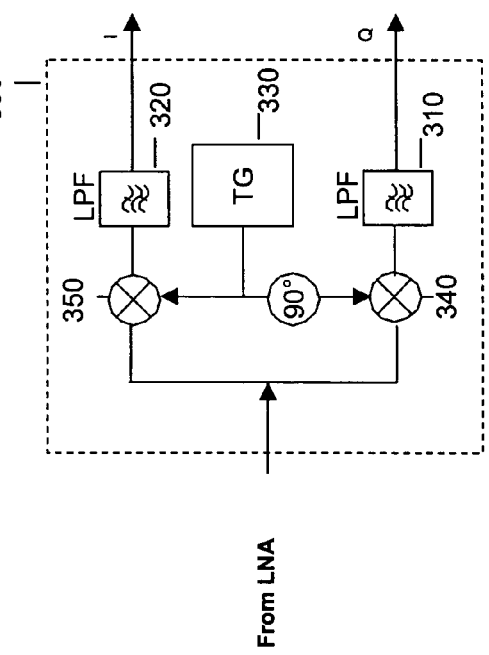
15A. Quadrature Correlator- M-ary PSK Detection
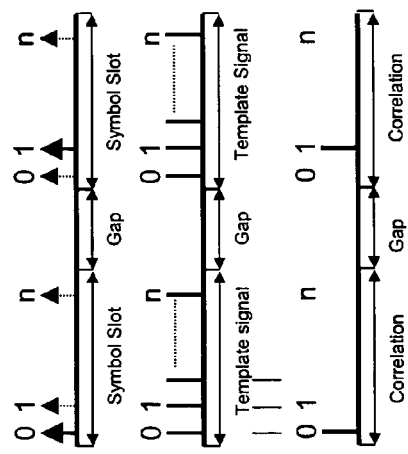
15B. Detection of M-ary PPM /OOK MODULATION
FIG. 15

ULTRA-WIDEBAND CORRELATING RECEIVER

This is a continuation-in-part of co-pending application Ser. No. 10/676,449, filed Sep. 30, 2003, entitled "ULTRA-WIDEBAND CORRELATING RECEIVER."

FIELD OF THE INVENTION

The present invention generally relates to ultra-wideband communications. More particularly, the invention concerns an apparatus for receiving and demodulating ultra-wideband electromagnetic pulses for wire and wireless communications.

BACKGROUND OF THE INVENTION

The Information Age is upon us. Access to vast quantities of information through a variety of different communication systems are changing the way people work, entertain themselves, and communicate with each other. For example, as a result of increased telecommunications competition mapped out by Congress in the 1996 Telecommunications Reform Act, traditional cable television program providers have evolved into full-service providers of advanced video, voice and data services for homes and businesses. A number of competing cable companies now offer cable systems that deliver all of the just-described services via a single broadband network.

These services have increased the need for bandwidth, which is the amount of data transmitted or received per unit time. More bandwidth has become increasingly important, as the size of data transmissions has continually grown. Applications such as movies-on-demand and video teleconferencing demand high data transmission rates. Another example is interactive video in homes and offices. Moreover, traffic across the Internet continues to increase, and with the introduction of new applications, such as the convergence of voice and Internet data, traffic will only increase at a faster rate. Consequently, carriers and service providers are overhauling the entire network infrastructure—including switches, routers, backbone, and the last mile (i.e., the local loop)—in an effort to provide more bandwidth.

Other industries are also placing bandwidth demands on Internet service providers, and other data providers. For example, hospitals transmit images of X-rays and CAT scans to remotely located physicians. Such transmissions require significant bandwidth to transmit the large data files in a reasonable amount of time. The need for more bandwidth is evidenced by user complaints of slow Internet access and dropped data links that are symptomatic of network overload.

Therefore, there exists a need for a method to increase the bandwidth of wired network or communication system, as well as a wireless network or communication system.

SUMMARY OF THE INVENTION

The present invention provides an apparatus for receiving and demodulating an ultra-wideband signal. The receiver may be configured to work in conjunction with wireless or wire communications mediums, whether the medium is twisted-pair wire, coaxial cable, fiber optic cable, or other types of wire media.

One feature of the present invention is it provides a receiver with demodulation capability of amplitude-, phase-, and timing-based modulation schemes. Another feature of the present invention is that it uses only a single correlator to detect and demodulate ultra-wideband pulses. Another feature of the present invention provides a receiver structured to operate in a multi-path environment.

These and other features and advantages of the present invention will be appreciated from review of the following detailed description of the invention, along with the accompanying figures in which like reference numerals refer to like parts throughout.

BRIEF DESCRIPTION OF THE DRAWINGS

FIG. 10 is an illustration of an ultra-wideband pulse signal coarse acquisition process, fine acquisition method, and pulse sampling method;

FIG. 15 illustrates another embodiment of a correlating receiver structured to receive various data modulation schemes.

It will be recognized that some or all of the Figures are schematic representations for purposes of illustration and do not necessarily depict the actual relative sizes or locations of the elements shown. The Figures are provided for the purpose of illustrating one or more embodiments of the invention with the explicit understanding that they will not be used to limit the scope or the meaning of the claims.

DETAILED DESCRIPTION OF THE INVENTION

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the present invention throughout this document does not mean that all claimed embodiments or methods must include the referenced feature(s).

The present invention provides a method of receiving and demodulating a plurality of electromagnetic ultra-wideband (UWB) pulses. The pulses can be transmitted and received wirelessly, or through any wire medium, whether the medium is twisted-pair wire, coaxial cable, fiber optic cable, hybrid fiber-coax, or other type of wire media.

Figure 1:
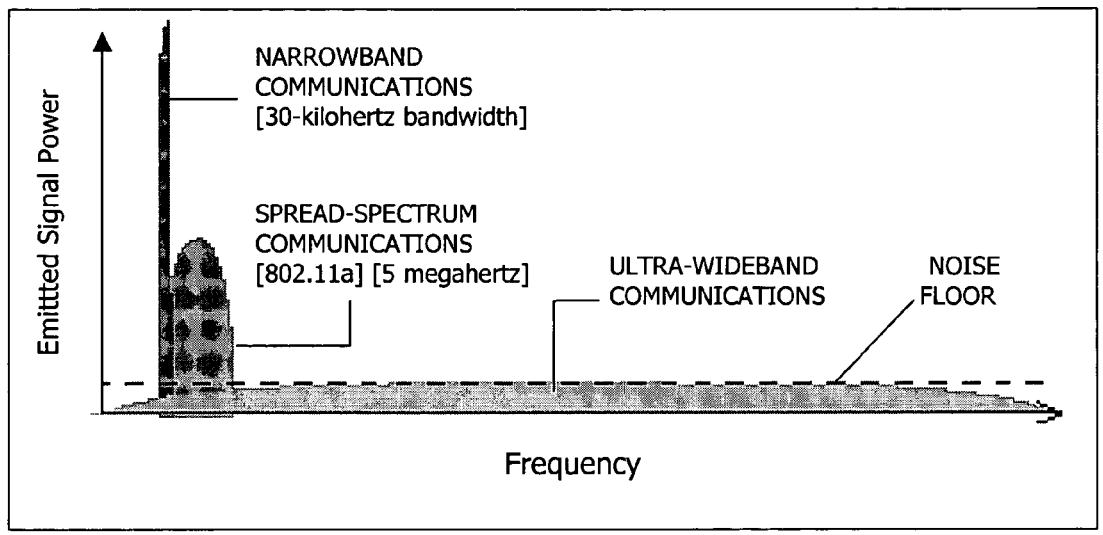
FIG. 1 is an illustration of different communication methods.
Figure 2:
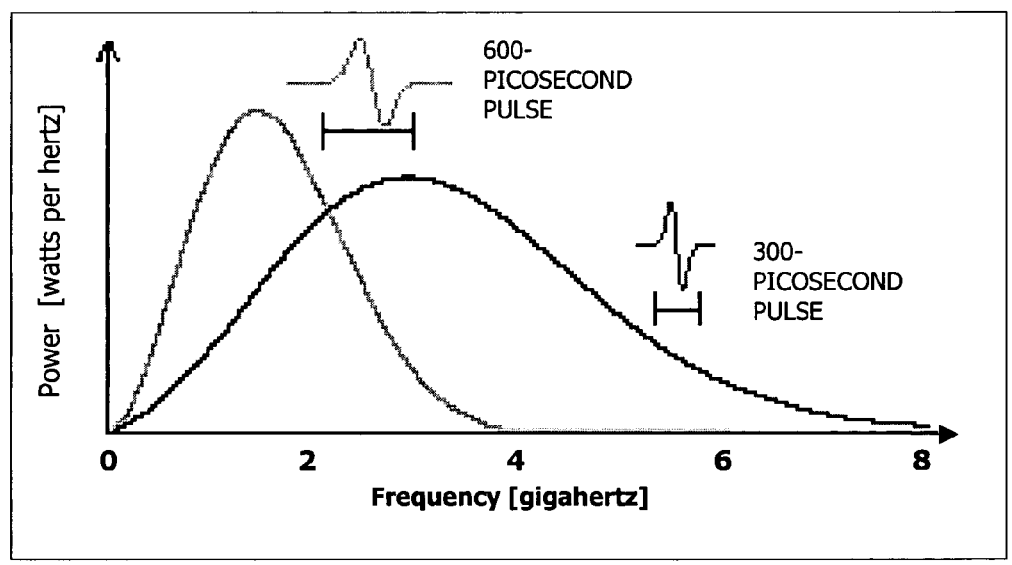
FIG. 2 is an illustration of two ultra-wideband pulses.

Referring to FIGS. 1 and 2, ultra-wideband (UWB) communication technology employs pulses of electromagnetic energy that are emitted at, for example, nanosecond or picosecond intervals (generally tens of picoseconds to a few nanoseconds in duration). For this reason, ultra-wideband is often called "impulse radio." That is, the UWB pulses are transmitted without modulation onto a sine wave carrier frequency, in contrast with conventional radio frequency technology as described above. A UWB pulse is a single electromagnetic burst of energy. That is, a UWB pulse may be a single positive burst of electromagnetic energy, a single negative burst of electromagnetic energy or a single burst of electromagnetic energy with a predefined phase.

Alternate implementations of UWB can be achieved by mixing baseband pulses with a carrier wave that controls a center frequency of a resulting UWB signal. Ultra-wideband generally requires neither an assigned frequency nor a power amplifier.

An example of a conventional radio frequency technology is illustrated in FIG. 1. IEEE 802.11a, a wireless local area network (LAN) protocol, transmits radio frequency signals at a 5 GHz center frequency, with a radio frequency spread of about 5 MHz. A UWB pulse may have a 2.0 GHz center frequency, with a frequency spread of approximately 4 GHz, as shown in FIG. 2, which illustrates two typical UWB pulses. FIG. 2 illustrates that the shorter the UWB pulse in time, the broader the spread of its frequency spectrum. This is because bandwidth is inversely proportional to the time duration of the pulse. A 600-picosecond UWB pulse can have about a 1.8 GHz center frequency, with a frequency spread of approximately 1.6 GHz and a 300-picosecond UWB pulse can have about a 3 GHz center frequency, with a frequency spread of approximately 3.2 GHz. Thus, UWB pulses generally do not operate within a specific frequency, as shown in FIG. 1. Because UWB pulses are spread across an extremely wide frequency range, UWB communication systems allow communications at very high data rates, such as 100 megabits per second or greater.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by reference.

Also, because a UWB pulse is spread across an extremely wide frequency range, the power sampled at a single, or specific frequency is very low. For example, a UWB one-watt pulse of one nano-second duration spreads the one-watt over the entire frequency occupied by the UWB pulse. At any single frequency, such as at the carrier frequency of a CATV provider, the UWB pulse power present is one nano-watt (for a frequency band of 1 GHz). This is calculated by dividing the power of the pulse (i.e., 1 watt) by the frequency band (i.e., 1 billion Hertz). Generally, a multiplicity of UWB pulses are transmitted at relatively low power (when sampled at a single, or specific frequency), for example, at less than −30 power decibels to −60 power decibels, which reduces interference with conventional radio frequencies. UWB pulses, however, transmitted through many wire media typically do not interfere with wireless radio frequency transmissions. Therefore, the power (sampled at a single frequency) of UWB pulses transmitted though wire media may range from about +30 dBm to about −140 dBm.

The present invention may be employed in any type of network, be it wireless, wire, or a mix of wire media and wireless components. That is, a network may use both wire media, such as coaxial cable, and wireless devices, such as satellites, or cellular antennas. As defined herein, a network is a group of points or nodes connected by communication paths. The communication paths may be use wires or be wireless. A network as defined herein may interconnect with other networks and contain sub-networks. A network as defined herein may be characterized in terms of a spatial distance, for example, such as a local area network (LAN), a personal area network (PAN), a metropolitan area network (MAN), a wide area network (WAN), and a wireless personal area network (WPAN), among others. A network as defined herein may also be characterized by the type of data transmission technology in use on it, for example, a Transmission Control Protocol/Internet Protocol (TCP/IP) network, and a Systems Network Architecture network, among others. A network as defined herein may also be characterized by whether it carries voice signals, data signals, or both. A network as defined herein may also be characterized by users of the network, such as, for example, users of a public switched telephone network (PSTN) other type of public networks, and private networks (such as within a single room or home), among others. A network as defined herein may also be characterized by the usual nature of its connections, for example, a dial-up network, a switched network, a dedicated network, and a non-switched network, among others. A network as defined herein may also be characterized by the types of physical links that it employs, for example, optical fiber, coaxial cable, a mix of both, unshielded twisted pair, and shielded twisted pair, among others.

The present invention may also be employed in any type of wireless network, such as a wireless PAN, LAN, MAN, or WAN. The present invention may be implemented in a "carrier free" architecture, which does not require the use of high frequency carrier generation hardware, carrier modulation hardware, stabilizers, frequency and phase discrimination hardware or other devices employed in conventional frequency domain communication systems.

One method practiced by the present invention involves modulation and demodulation of data by employing Differentially Phase Shift Keying (DPSK), or Phase Shift Keying (PSK) for an ultra-wideband receiver. An incoming signal may be a plurality of ultra-wideband (UWB) pulses wherein each of the pulses includes data encoded within a phase of the pulse. One method herein described initially estimates timing of the incoming signal with the use of a correlator and an energy estimator. In one embodiment of the present invention, the correlator produces a UWB pulse that matches in frequency and phase a UWB pulse generated by a UWB transmitter. The lower mixing (or multiplication) product that represents the UWB pulse is forwarded to a UWB pulse envelope matched filter. Additional components of the correlation receiver may include a multiplicative mixer, amplifiers, and band-pass and low-pass filters. The incoming signal may be correlated with a local template signal then sent to the energy estimator.

The energy estimator may include an absolute value detector such as a rectifier or a square law detector that outputs the square of the incoming signal. The function of the absolute value detector is to provide a rectified pulse to an integrator. The integrator sums the UWB pulse, or signal across a finite time period and provides its output as a coarse timing signal to an analog to digital converter (ADC) and then to a digital signal processor (DSP). This summed signal gives the receiver a coarse timing estimate of the incoming signal or UWB pulse window. This coarse signal, which in one embodiment is within one period of the UWB pulse, is appropriate for fast acquisition of UWB pulse position. The energy estimator provides a reference signal for accurate phase/frequency tuning of a UWB pulse template to an incoming UWB pulse, or signal.

Figure 3:
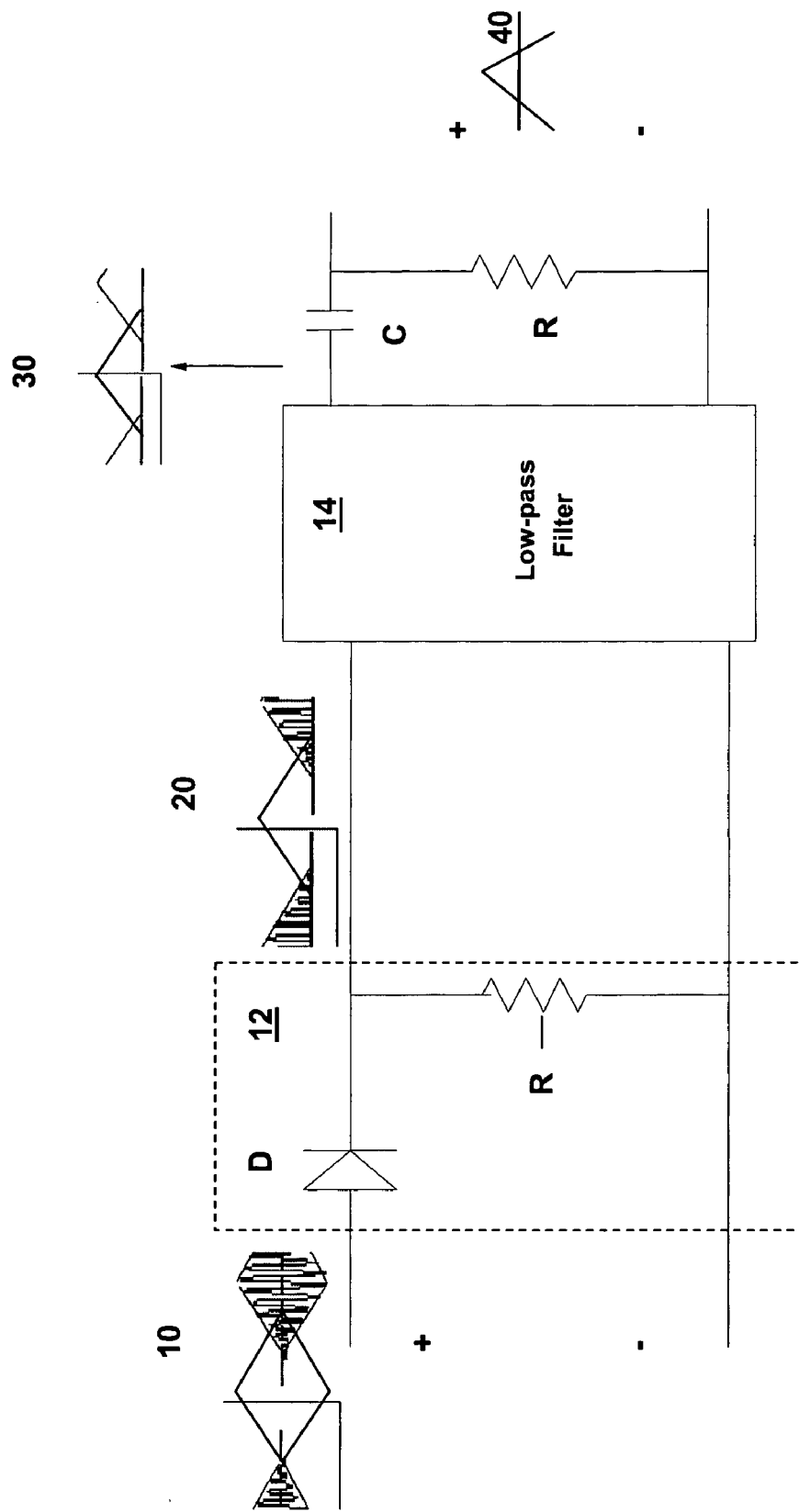
FIG. 3 is an illustration of a conventional non-coherent receiver architecture.

A number of receiver architectures are known in the art of ultra-wideband communications. These conventional architectures can be classified into two basic groups: coherent and non-coherent. One usual approach, as illustrated in FIG. 3, to non-coherent detection and demodulation involves the use of envelope detectors 12 to provide an output signal 40 that is representative of an incoming signal 10. The incoming signal 10 arrives at an envelope detector 12 that includes a resistor R1 and a Diode D1. A negative part of the incoming signal 10 is suppressed by the diode D1 and a half wave rectified signal 20 is developed across the resistor R1. The half-wave rectified signal 20 contains high frequency components that are attenuated by a low-pass filter 14. A resultant low frequency signal 30 is representative of the input signal but has a direct current (DC) offset. A capacitor C1 blocks the DC component of the signal 30 and the output signal 40 is developed across a resistor R2.

Non-coherent architectures have been used in the field of communications to receive and demodulate both amplitude-related signal modulation schemes, such as Amplitude Modulation (AM), dual sideband modulation, single sideband modulation, vestigial sideband modulation, as well as angle-related modulation schemes such as Frequency Modulation (FM) and Phase Modulation (PM).

Conventional UWB receivers, as described above, typically use two correlating chains. A correlating chain is a process for performing one or more functions. For example, a continuous time correlating chain includes an analog correlator that includes a product (or mixer) followed by an integrator. An incoming signal is multiplied by a locally generated signal and transmitted to an integrator that integrates and dumps the signal over a period of time.

One correlating chain is used to provide a coarse timing estimate of a pulse. The coarse timing estimate is used to dither the frequency and phase of a locally generated signal. A second correlating chain is used as a data detector to lock-in on a precise timing of the signal and a peak of the pulse.

According to one embodiment of the invention, an ultra-wideband (UWB) receiver uses only a single correlator to estimate the coarse timing and also updates a locally generated signal for data detection. In another embodiment, the correlation receiver may include an absolute value detector that receives output from a pulse amplifier and delivers inputs into an integrator. By using an absolute value detector in such a manner, this allows the integrator to integrate and dump over a wider range of time. In addition, the absolute value detector provides twice as much energy as typically transmitted to the integrator by adding a negative portion of the correlated signal (i.e., taking the absolute value of the signal) to the positive portion of the correlated signal. This is because conventional UWB receivers use a diode which prevents the negative portion of a correlated signal from being transmitted to the integrator. Thus, only half of a signal is used to obtain the coarse timing signal.

Figure 4:
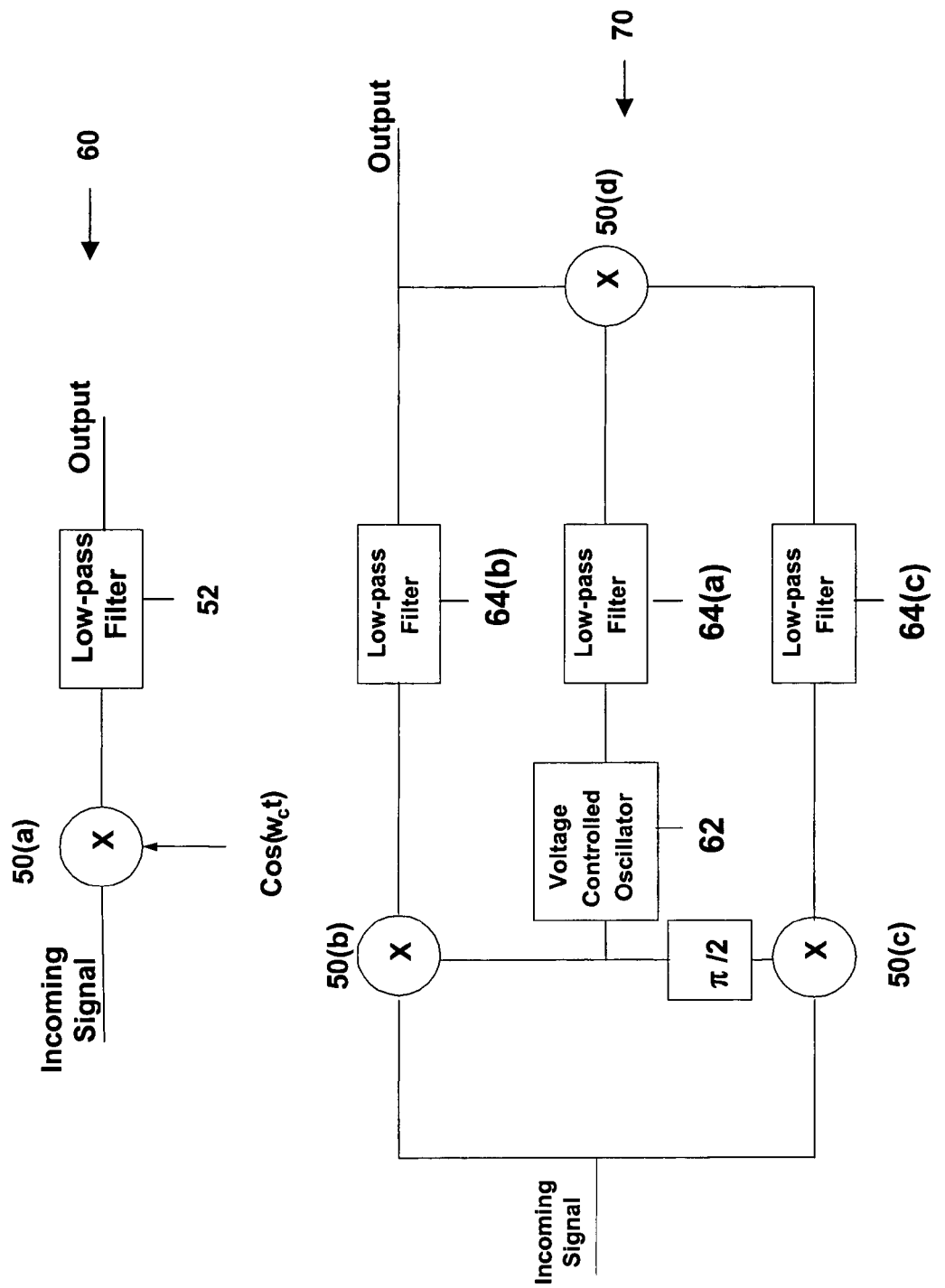
FIG. 4 is an illustration of two conventional coherent receiver architectures.

In communication systems having a transmitter that uses a signal modulation technique that does not include a carrier in a resultant spectrum, such as Dual Sideband Suppressed Carrier (DSBSC), a coherent detector is commonly used. A conventional coherent receiver architecture 60 is illustrated in FIG. 4. An incoming signal is multiplied by a locally generated signal $\cos(\omega_c t)$ using a mixer 50(a). The locally generated signal is at the same frequency $\omega_c$ as a carrier of the incoming signal. The product of the incoming signal and the locally generated signal will have two components. Because the locally generated signal is at a carrier frequency, the first signal component will be low frequency or close to DC. The second signal component is at twice the carrier frequency. A low-pass filter 52 may be used to attenuate a high frequency component of the output signal.

Other coherent receiver architectures exist, such as a "Costas loop" architecture 70, illustrated in FIG. 4. In this architecture, a voltage controlled oscillator (VCO) 62 generates a local signal which is mixed with an incoming signal by a mixer 50(b) to produce a first mixed signal. A copy of the local signal may be phase delayed by $\pi/2$ and mixed with the incoming signal by mixer 50(c) to produce a second mixed signal. The mixed signals are then mixed to produce an error signal, which may then be transmitted through a low-pass filter 64(a), 64(b), 64(c) to control the VCO 62. In this configuration, the first mixed signal is taken as an output.

A number of correlator designs, or architectures are used in ultra-wideband communications. In one architecture, two correlators are used. Each correlator includes a mixer and an integrator. A local template signal is generated and delayed with a delay element to produce a second template signal. The first template signal is correlated with an incoming signal. The incoming signal is additionally correlated with the delayed template signal. Either the first or second correlator provides a feedback signal to the template generator.

Figure 5:
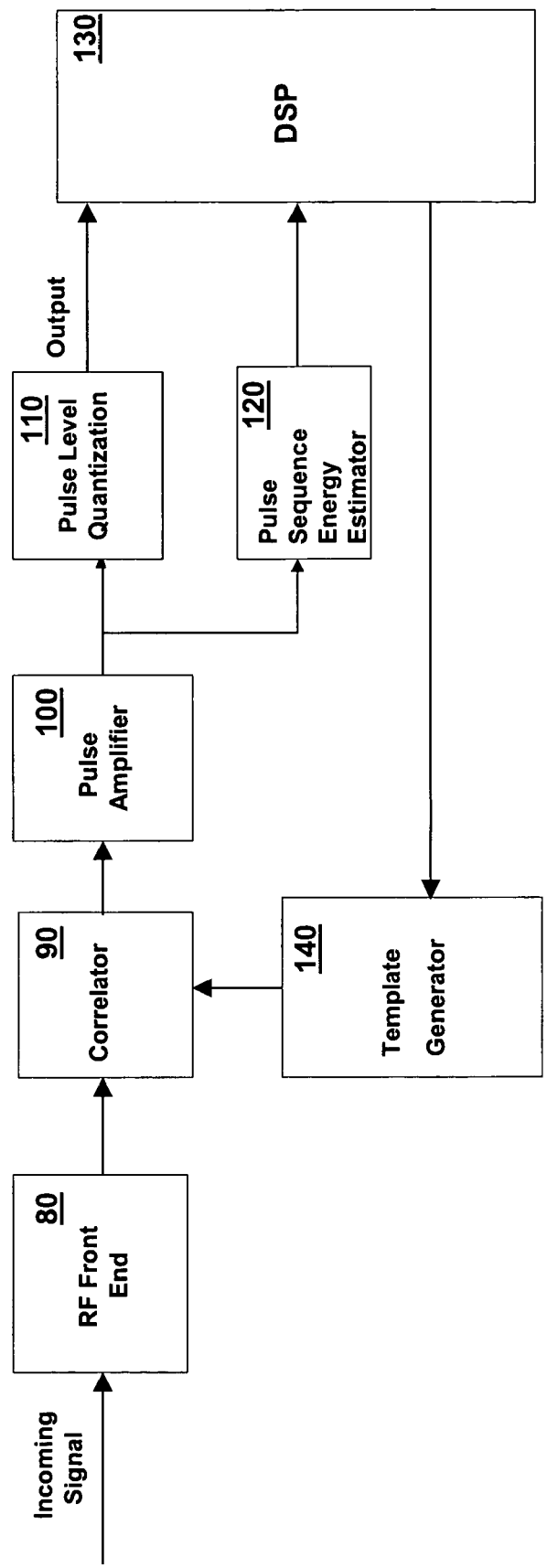
FIG. 5 is an illustration of one embodiment of the present invention.
Figure 6:
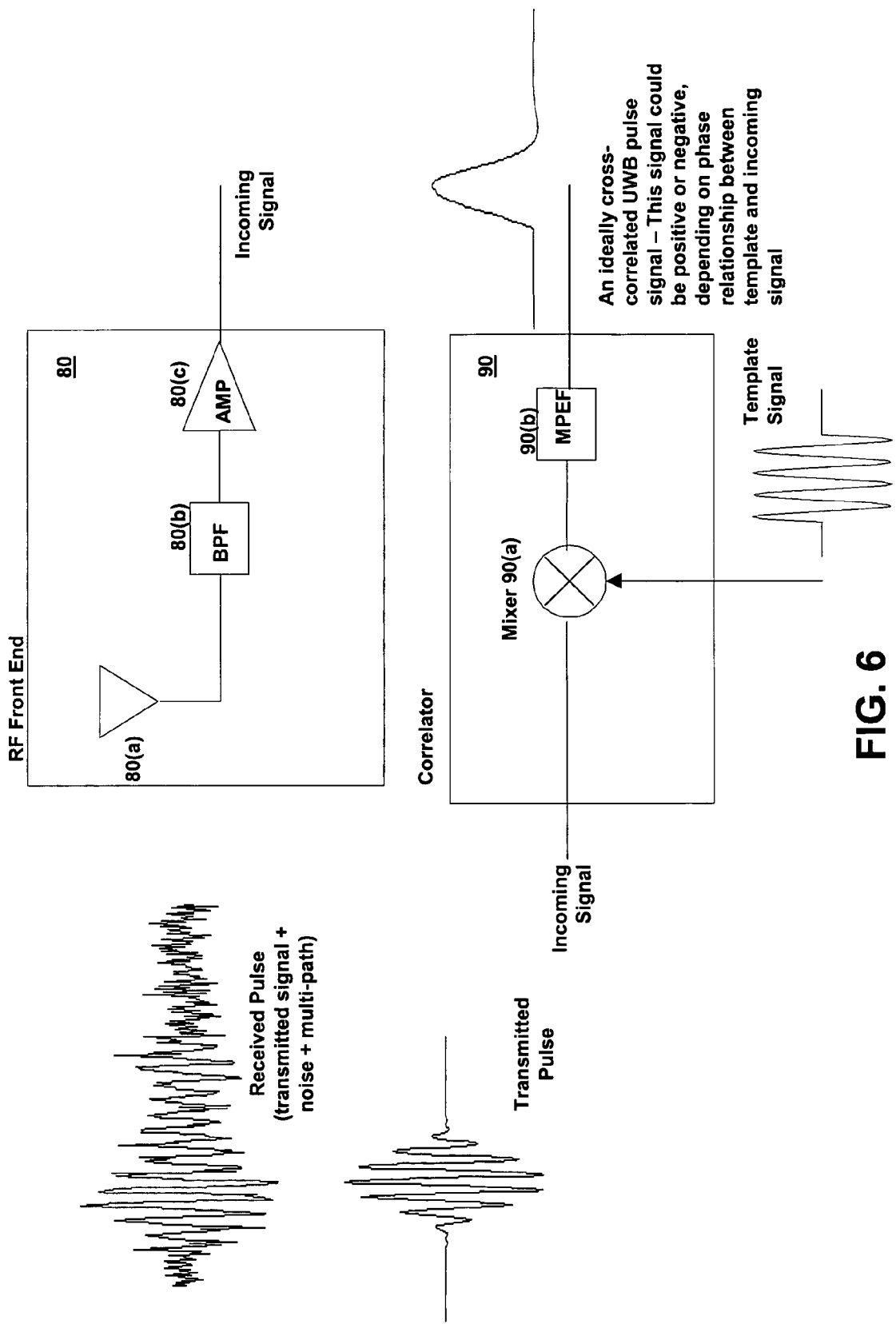
FIG. 6 is an illustration of one embodiment of a radio frequency front-end and a correlator as shown in FIG. 5.

FIG. 5 illustrates an ultra-wideband correlating receiver constructed according to one embodiment of the present invention. As shown in FIG. 5, an incoming signal is received at a radio frequency (RF) front end 80. As shown in FIG. 6, the RF front end 80 may include an antenna 80(a), a, at least one filter 80(b), and at least one amplifier (AMP) 80(c). The filter 80(b) may be a band-pass filter (BPF). The amplifier 80(c) may be a low noise amplifier with or without gain control (GC) capabilities.

As shown in FIGS. 5 and 6, the correlator 90 may include a mixer 90(a) and a UWB pulse matched filter (MPEF) 90(b). Additionally, there may be an optional amplifier in the correlator (not shown). The optional amplifier may include gain controlled capabilities. The mixer 50(d) multiplies the incoming signal by a locally generated template signal. The product of these signals has a high frequency component and a low frequency component. The high frequency component and noise is filtered by the UWB pulse matched filter 90(b).

Figure 7:
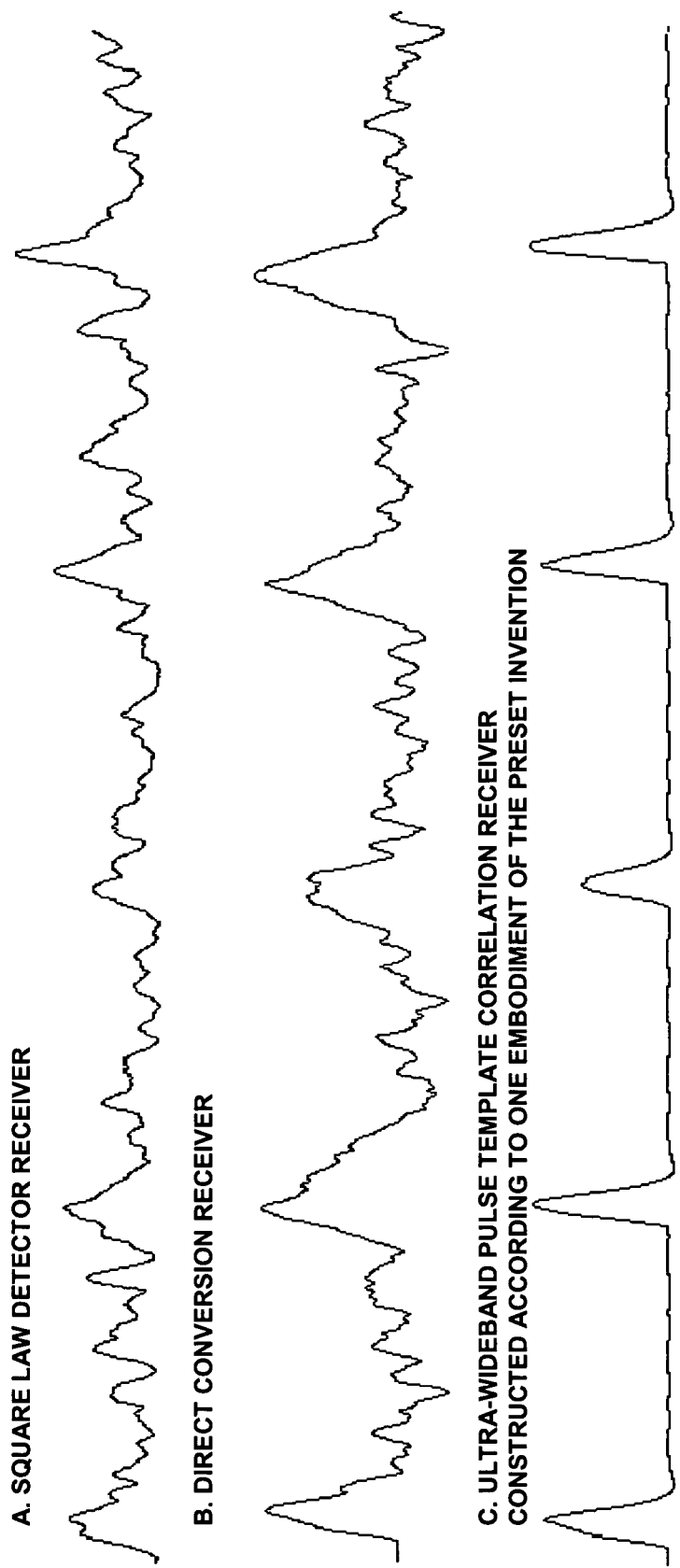
FIG. 7 is an illustration of the output of different receivers in the presence of white noise and multi-path conditions.

By adjusting the frequency/phase of a UWB pulse-shaped template to an incoming frequency/phase of a UWB pulse, and passing the resulting signal through the UWB pulse matched filter 90(b), the correlator 90 outputs a better approximation of time of receipt of the UWB pulse, and produces a better estimate of frequency, polarity and/or phase of the incoming signal, when compared to conventional devices, as illustrated in FIG. 7. Specifically, FIG. 7 illustrates the output from a square law detector receiver (A), a direct conversion receiver (B), and a UWB correlation receiver (C), constructed according to one embodiment of the present invention.

Figure 8:
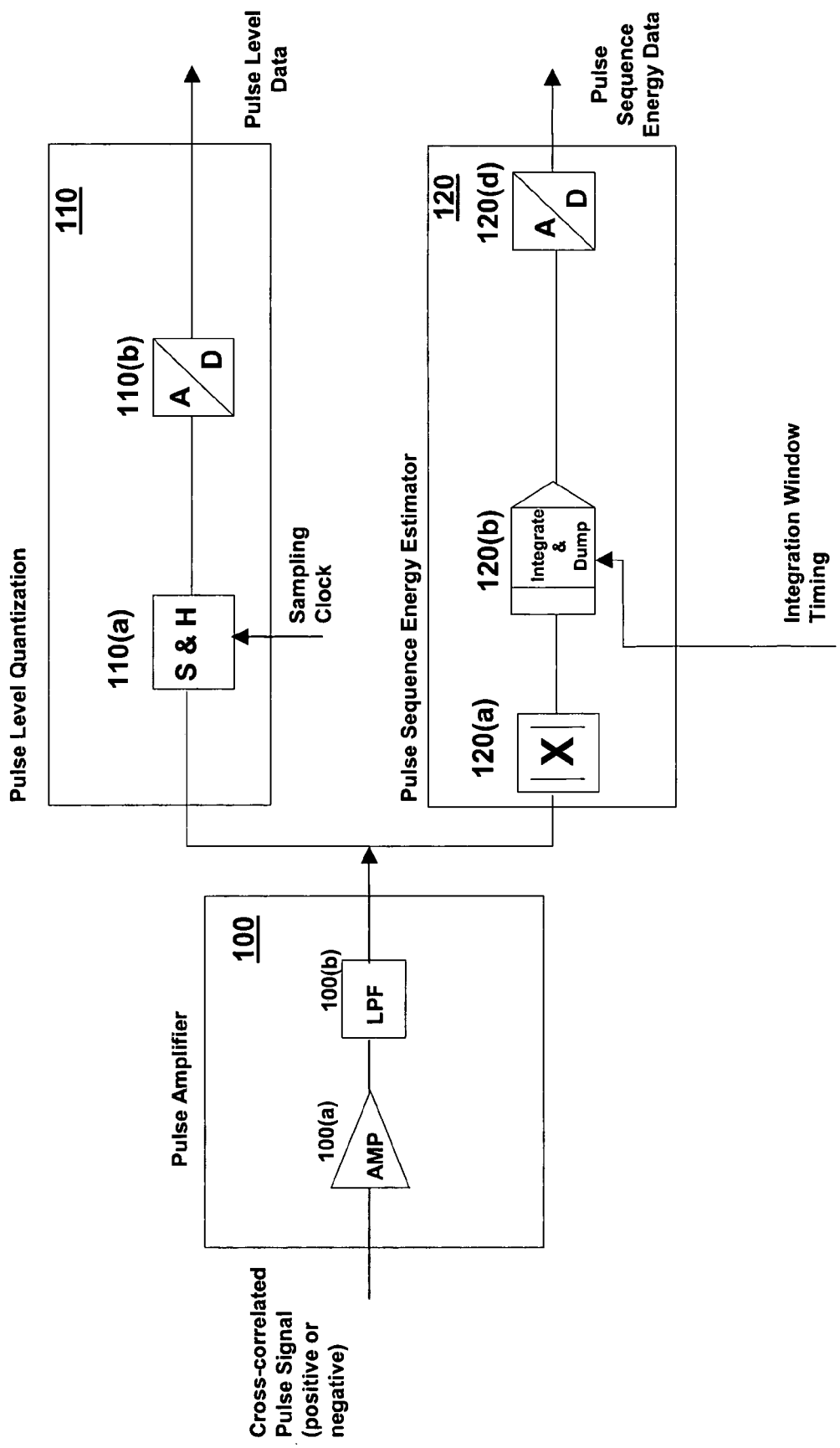
FIG. 8 is an illustration of one embodiment of the pulse level quantization block, pulse amplifier and energy estimator as shown in FIG. 5.

Referring to FIGS. 5 and 8, a cross correlated ultra-wideband (UWB) pulse signal from the correlator 90 may be forwarded to a pulse amplifier 100 for further amplification in amplifier 100(a). The pulse amplifier 100 may include a low-pass harmonic filter 100(b). The pulse sequence energy estimator 120 may be used to provide a correlated pulse energy level in a coarse/fine tuning process. The pulse sequence energy estimator 120 signal may be transmitted to a digital signal processor (DSP) 130 (shown in FIG. 5) that provides a correlation aperture window signal, and/or a fine tuning signal for adjusting to a UWB pulse phase/frequency, and also executes a coarse UWB pulse positioning/fine tuning algorithm.

Figure 9:
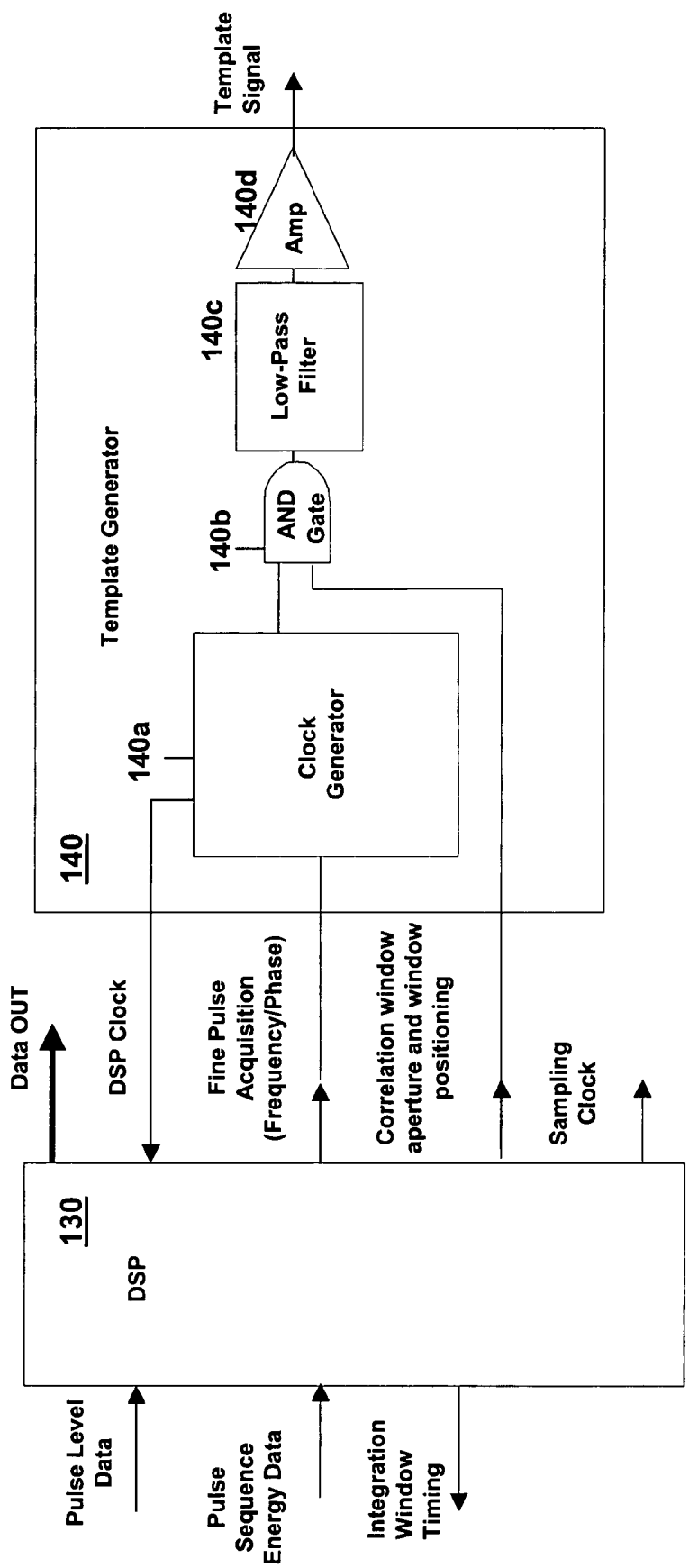
FIG. 9 is an illustration of one embodiment of the Digital Signal Processor (DSP) and the template generator as shown in FIG. 5.

Additionally, all DSP 130 timing processes may be synchronized from a template generator 140 that includes a clock generator 140(a) (shown in FIG. 9). The pulse sequence energy estimator 120 may include an absolute value detector 120(a) that converts a negative portion of a correlated signal into a positive portion. The absolute value detector 120(a) may include a square law detector. The pulse sequence energy estimator 120 may additionally include an integrate and dump function 120(b). The integrate and dump function 120(b) sums energy over a fixed time period and outputs a signal corresponding to the amount of energy summed over that time period. The energy estimator 120 may further include an analog-to-digital (A/D) converter 120(d). The A/D converter 120(d) may provide a correlated pulse energy level to the DSP 130. One purpose of the correlated pulse energy level window signal is to provide a reference related to the degree of correlation between the template and an incoming pulse to the DSP 130. The DSP 130 then makes a decision relating to window aperture positioning and phase/frequency correction.

As shown in FIGS. 5 and 8, the pulse level quantization block 110 may include a sample-and-hold function 110(a) and an A/D function 110(b). The correlated signal may be sampled by the sample-and-hold function 110(a) and converted to a digital signal by the A/D function 110(b). The correlated signal may carry data that represents polarity or pulse position in a data modulation symbol slot by its presence or absence in a given symbol slot location. The A/D function 110(b) may be multi-level wherein it is capable of producing one, or more, bit resolution from a sample. In a preferred embodiment, the A/D function 110(b) is a 4-bit per sample resolution.

As shown in FIGS. 5 and 9, the DSP 130 receives the data signal or digitized pulse level from a pulse level quantization block 110 and the signal that is proportional to pulse sequence energy content from the pulse sequence energy estimator 120. Preferably, an integration window timing pulse is provided by the DSP 130 as well, and it is forwarded to an integrate and dump block 120(b). The DSP 130 may comprise one or more of: a Digital Signal Processor (DSP); a general-purpose computer processor; or a finite state machine. The DSP 130 may further process and format the received data.

Additionally, as shown in FIGS. 5 and 9, the DSP 130 may generate two output signals to the template generator 140. Both outputs may be based on an pulse sequence energy data input which represent output from the pulse sequence energy estimator 120. The coarse pulse acquisition signal provides a correlation window (Tw) (shown in FIG. 10A) and its position within a symbol slot (Ts). In a preferred embodiment, accuracy of positioning may be defined within one period of an ultra-wideband pulse. The correlation window Tw may be shifted within the symbol slot Ts until the pulse sequence energy ($E_{0-n}$) data exhibits its highest level, as shown in FIG. 10A(1). Pulse sequence energy ($E_{0-n}$) data is provided by A/D converter 120(d) of pulse energy estimator 120.

As shown in FIGS. 9 and 10B, when coarse acquisition is completed, and the position of the correlation window Tw within the symbol slot Ts is achieved, a fine pulse acquisition signal may vary the frequency/phase of a reference oscillator (not shown) in clock generator 140(a) of template generator 140, until the energy data signal exhibits its new highest level that corresponds to a minimal phase difference $\phi$ (as shown in FIG. 10B), with a 0 or 180 degree offset between a signal template and a pulse.

Referring to FIGS. 8, 9 and 10C, after successful signal acquisition, DSP 130 provides a sampling clock to the pulse level quantization block 110. This sampling clock is phased in such way that its sampling edge falls in the middle of an incoming ultra-wideband (UWB) pulse. This may be achieved by delaying a sampling edge by Tp (as shown in FIG. 10C) relative to a synchronized correlation window aperture. Multiple sampling within the UWB pulse duration is also possible in order to achieve a better signal-to-noise ratio.

As shown in FIGS. 5 and 8, after processing by the sample-and-hold function 110(a) and the A/D function 110(b), a digitized pulse is then forwarded to the DSP 130 as pulse level data input. After processing in the DSP 130, the data may be provided to a user in a number of different formats, such as, USB, PCI, serial synchronous, serial asynchronous, etc.

Referring now to FIGS. 5 and 9, within the template generator 140, a standard clock input may accept clock output from a clock generator 140(a) that is generated from a common reference oscillator, causing all timing events to appear synchronous. The template generator 140 may include a signal generator 140(a) such as a phase locked loop (PLL), a gating function 140(b), a harmonic low pass filter 140(c) and an optional amplifier 140(d). The clock generator 140(a) may include components normally present in a frequency synthesizers such as a PLL, a voltage controlled oscillator (VCO), filters, amplifiers, passive or active multipliers, digital dividers, and counters, to name a few. The clock generator 140(a) generates a signal whose frequency is equal or close to a received ultra-wideband pulse frequency. This frequency is forwarded to the AND gate function 140(b). The clock generator 140(a) provides a lock to DSP 130 that assures timing synchronicity. The clock frequency/phase may be controlled by the DSP 130 by means of a tunable frequency reference oscillator that is part of the clock generator 140(a).

As shown in FIG. 5, a "loop" comprising the correlator 90, pulse amplifier 100, pulse sequence energy estimator 120, DSP 130 and template generator 140 are shown. Shown in FIGS. 8 and 10A(2), the gating function 120(b) allows a signal whose frequency is equal or close to a received ultra-wideband pulse to pass when the DSP 130 sends a template window with a duration of Tw. When the DSP 130 determines the coarse timing of an incoming signal it begins to dither the phase/frequency first and second signals to achieve the optimum correlation from the correlator 90. Optimum correlation values are achieved when the frequency of the template signal best matches the frequency/phase of the incoming ultra-wideband pulse. Low-pass filter 140(c) (FIG. 9) serves as a harmonic suppressor that eliminates the high frequency content from the square wave that is received from gate 140(b) and thus provides a sine wave to the input of the optional amplifier 140(d). Minimum correlation values then indicate a phase shift in the data relative to the template, and maximum values indicate no phase shift between the template signal and the incoming signal.

Figure 11:
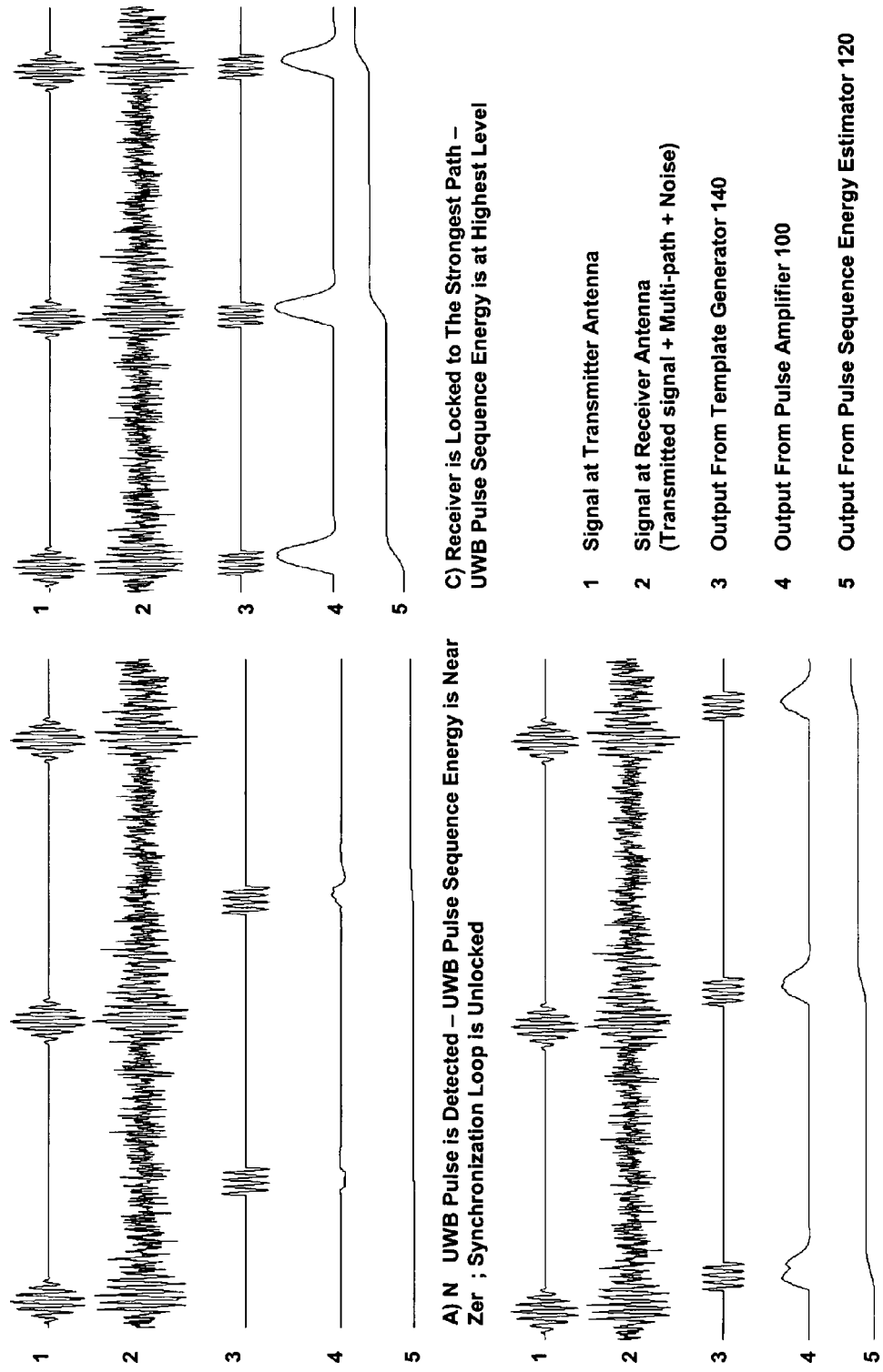
FIG. 11 is an illustration of the ultra-wideband pulse acquisition process in the presence of multi-path interference and white noise.

FIG. 11 is an illustration of the ultra-wideband pulse acquisition process in the presence of multi-path and white noise. Specifically, three different stages of ultra-wideband pulse acquisition are illustrated: A) when no ultra-wideband pulse is detected by the correlating receiver constructed according to one embodiment of the present invention; B) when a weak ultra-wideband pulse is detected by the correlating receiver constructed according to one embodiment of the present invention; and C) when a strong ultra-wideband pulse is detected by the correlating receiver constructed according to one embodiment of the present invention.

Figure 12:
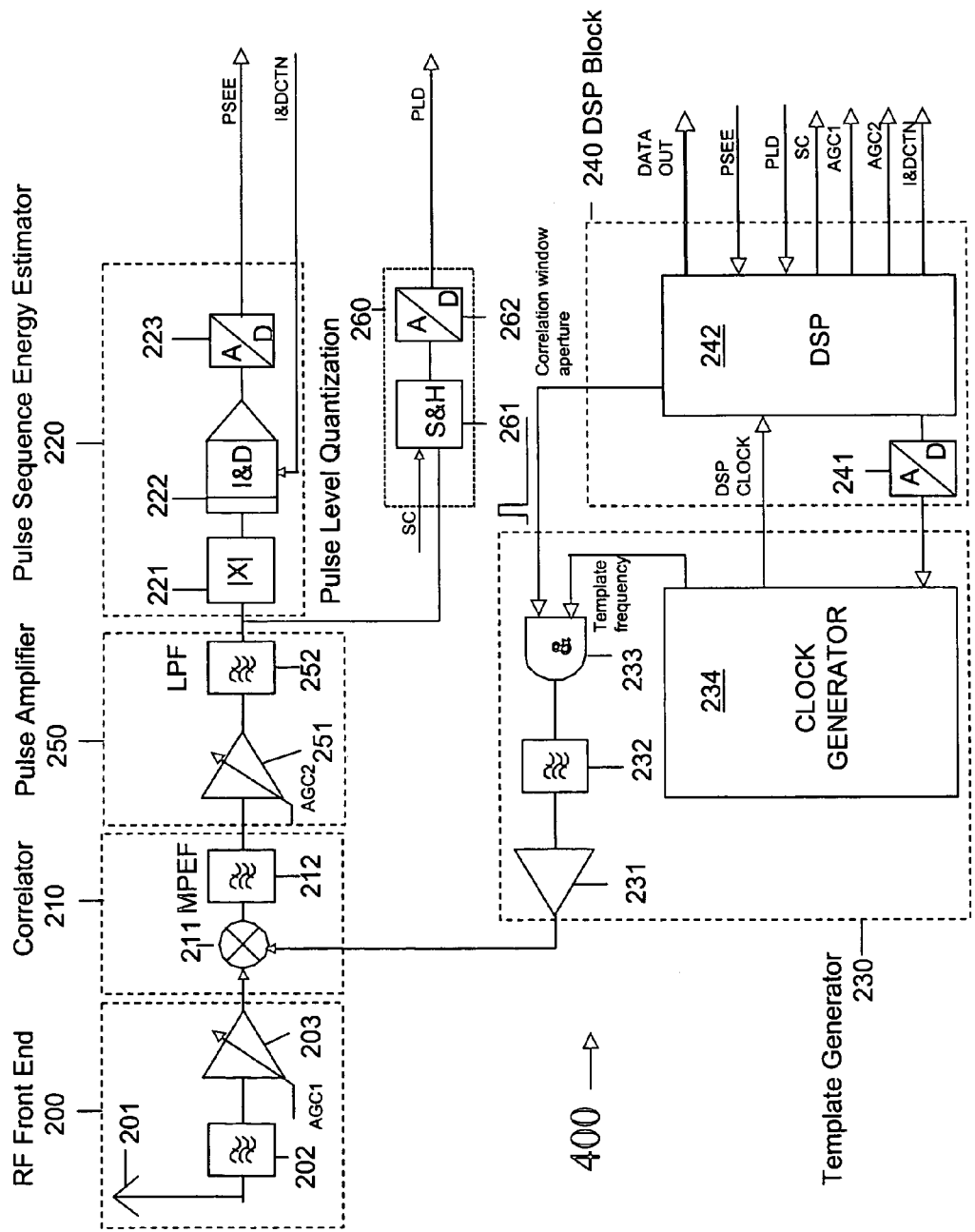
FIG. 12 is an illustration of an ultra-wideband pulse receiver according to one embodiment of the present invention.

FIG. 12 illustrates an ultra-wideband correlator receiver 400 that uses binary phase shift keying according to one embodiment of the present invention. The receiver 400 may include an RF front end 200. The RF front end 200 may include an antenna 201, band-pass filter 202, and low noise amplifier 203. According to one embodiment, the band-pass filter 202 filters signals having a frequency in a range of 3–5 GHz and the amplifier 208 is an automatic gain control (AGC) amplifier.

The RF front end 200 may be in communication with a correlator 210. The correlator 210 may include a mixer 211, and an ultra-wideband pulse envelope matched filter 212. Pulse amplifier 250, may include pulse amplifier 251 and low-pass filter 252. According to one embodiment, amplifiers 203 and 251 containing gain control may be included in automatic gain control loops AGC1 and AGC2. The correlator 210 receives an incoming signal from the RF front end 200. A template generator 230 generates a local signal that is transmitted to the correlator 210. The template generator 230 may include a mixer amplifier 231, low pass harmonic filter 232, "and" gate 233, and clock generator 234. According to one embodiment, the clock generator 234 may be a phase-locked loop (PLL). It will be appreciated that other components may be added, or substituted for any of the above described components.

Again referring to FIG. 12, the local signal from the template generator 230 is multiplied with the incoming signal from the RF front end 200 by the mixer 211 of the correlator 210. A UWB pulse envelope matched filter 212 provides optimal filtration of high level mixing product and noise. The resulting signal may be transmitted to the amplifier 251 and subsequently pass through the second low-pass filter 252 for higher harmonic filtration that may appear as a result of non-linearities in amplifier 251, yielding a processed signal. The processed signal may be transmitted to an pulse sequence energy estimator 220. The energy estimator 220 may include an absolute value detector 221, an integrate-and-dump function 222, and an analog-to-digital converter function 223. The absolute value detector 221 converts a negative portion of the correlated signal into a positive portion. The absolute value detector 221 may include a square law detector that outputs the square of the incoming signal. An integrate-and-dump function 222 may be used to sum energy over a fixed period of time and output a signal corresponding to an amount of energy summed over that period.

As shown in FIG. 12, the correlated signal may also be passed to a pulse level quantization block 260. The pulse level quantization block 260 may include a sample-and-hold function 261 and also an analog-to-digital converter 262, which may provide a quantized pulse level to DSP 240. The incoming signal may be sampled by the sample-and-hold function 261 and converted to a digital signal by analog-to-digital converter 262. According to one embodiment, the analog-to-digital converter 262 is a 2, 3, 4, 5, 6, 7, or 8 bit-per-sample converter.

The DSP 240 may include a digital signal processor 242 and analog-to-digital converter 241. The digital signal processor 242 receives a data signal from the pulse level quantization block 260 and the pulse sequence energy estimator 220. The data and window signals may be received by the digital signal processor 242. The DSP 240 may decode, provide error correction, format output data and provide template window acquisition and tracking algorithms. The digital-to-analog converter 241 may be used to provide a signal for the incoming pulse tracking by providing template phase/frequency adjustment.

Again referring to FIG. 12, an output of the DSP 240 may be used as input to the template generator 230. The output may include a first output and a second output. The first output may provide coarse correlation window aperture generation and positioning. A pulse sequence energy estimator signal may be used to inform the DSP 240 when an incoming signal has been acquired and thus provide feedback for acquisition and fine tuning algorithms. The second output to the template generator of the DSP 240 may be a analogue signal that provides the phase and frequency adjustment to the incoming signal by using the pulse sequence energy estimator (PSEE) output. It will be appreciated that the correlator receiver 400 may have components added to, removed from, or substituted for any of the above described components to achieve the same, or similar function(s).

Figure 13:
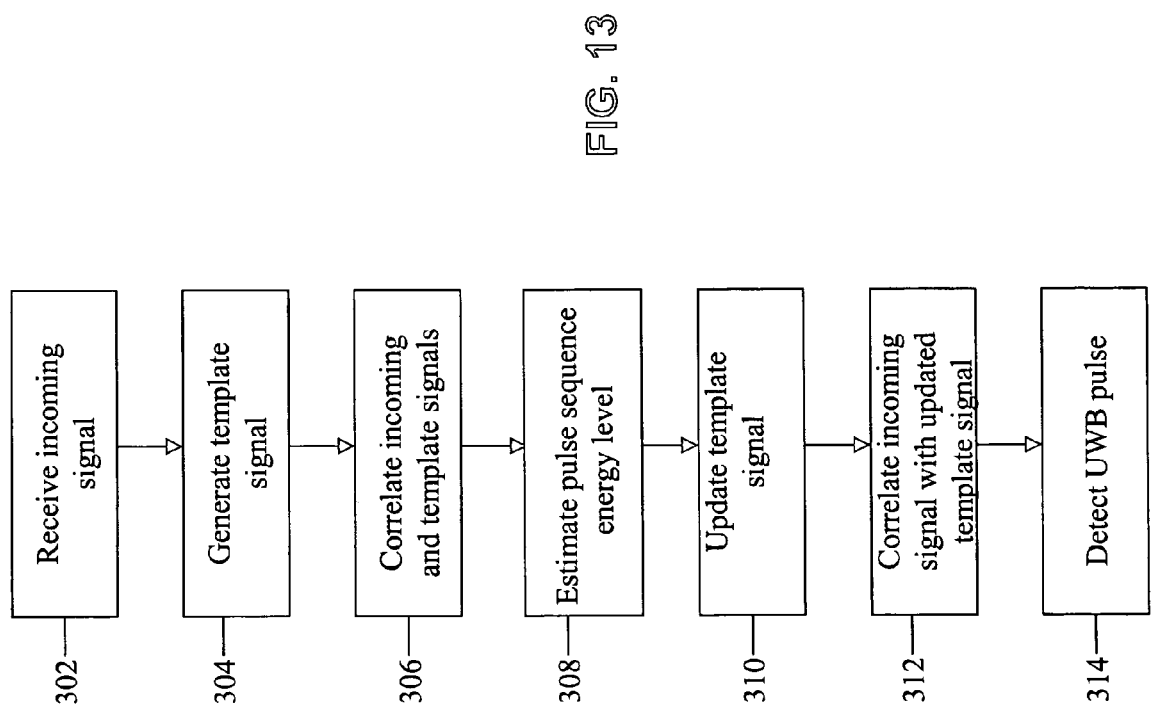
FIG. 13 illustrates a method for receiving ultra-wideband signals according to one embodiment of the present invention.

FIG. 13 illustrates a method for receiving ultra-wideband (UWB) pulses, or signals according to one embodiment of the invention. In step 302, an incoming signal from a transmitting device may be received. In step 304, a template signal may be generated locally by template generator. Preferably, the template signal is at the same frequency and phase as the incoming ultra-wideband pulse. In step 306, the incoming signal and the template signal may then be correlated. Correlating may include multiplying the incoming signal and the template signal using, for example, a mixer. The product of the incoming and template signals typically results in a signal having a high frequency component and a low frequency component. Correlation may also include attenuating the high frequency component using, for example, an ultra-wideband pulse envelope matched filter.

In step 308, a coarse UWB pulse sequence energy level may be estimated. In step 310, the template signal may be updated using a coarse pulse correlation aperture window signal, as well as fine tuning algorithms and processes for adjusting phase/frequency to the incoming UWB pulse. In step 312, the updated template signal and the incoming signal may be correlated. In step 314, an ultra-wideband pulse from the correlated incoming signal and the updated template signal may then be detected.

Figure 14:
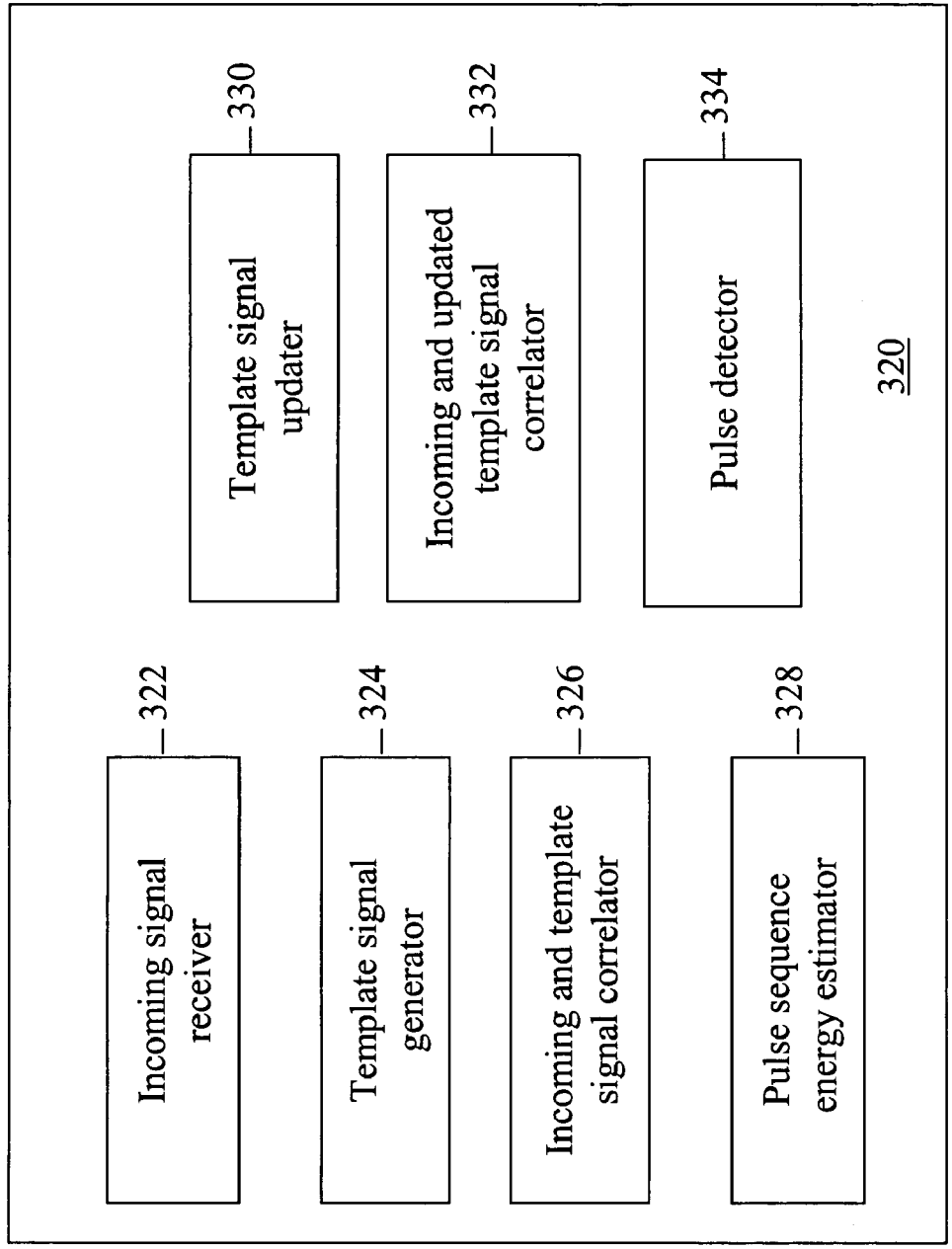
FIG. 14 illustrates a system for receiving ultra-wideband signals according to one embodiment of the present invention.

FIG. 14 illustrates a system 320 for receiving ultra-wideband pulses, or signals according to one embodiment of the invention. The system 320 may include an incoming signal receiver 322, template signal generator 324, incoming signal and template signal correlator 326, pulse sequence energy estimator 328, template signal updater 330, incoming and updated template signal correlator 332, and pulse detector 334. The incoming signal receiver 322 may receive one or more transmitted UWB pulses, or signals using, for example, an antenna. A template signal may be generated using the template signal generator 324. The template signal generated is preferably of the same frequency/phase as the incoming UWB pulse. The incoming signal and the template signal may be transmitted to the incoming and template signal correlator 326. The incoming and template signal correlator 326 may be used to correlate the incoming signal with the template signal. The incoming and template signal correlator 326 may multiply the incoming signal and the template signal and optimally filter an output signal by employing an envelope matched filter.

The pulse sequence energy estimator 328 may be used to estimate pulse sequence energy that may be used for coarse template positioning and fine frequency tuning. The template signal updater 330 may then update the template signal parameters using a pulse sequence energy estimator signal. The updated template signal and the incoming signal may be correlated using the incoming and updated template signal correlator 332. A pulse from the correlated incoming signal and updated template signal may then be detected using pulse detector 334.

One feature of the present invention is to provide a receiver device, or architecture for ultra-wideband (UWB) communications which is capable of receiving and demodulating data that is transmitted using a variety of signal modulation techniques or methods. For example, some of the modulation methods may be: Pulse Amplitude Modulation, On-Off keying, Ternary Modulation, Pulse Position Modulation, and Binary Phase Shift Keying (BPSK). One feature of the present invention is that the multi-level A/D function 110(*b*) (shown in FIG. 8), allows for the detection of UWB pulse amplitudes. On-Off keying may be demodulated in the present invention by the presence or absence of energy at a specific time.

Pulse positioning modulation detection may be achieved according to method and apparatus illustrated in FIG. 15B. In this case, a template is generated a multiple number of times within a modulation symbol slot in such a way that the template timing corresponds to the possible pulse position within the symbol slot. In this case, template correlation with the incoming UWB pulse determines it position within symbol slot.

Ternary modulation carries data in unique data groups that always contain a polarity of a pulse and also the absence of a pulse within each symbol slot data group. Because the present invention can determine the difference between polarities and the time of arrival of the UWB pulse, the DSP 240 (shown in FIG. 12) may process ternary modulation. BPSK modulation carries data in one of two distinct phases and the correlating receiver architecture herein described is capable of demodulating incoming signals with two (2) distinct polarities or phases.

Referring to FIG. 15A, the addition of a second correlator channel 300, that contains multipliers, or mixers 340 and 350, a phase shifter or delay line (shown as a 90 degree phase shift), a template generator 330, and matched UWB pulse envelope filters 310, 320, may allow for detection and demodulation of signals where four or more phases are used to carry information. In that situation, amplitude and timing information may be extracted in a similar manner making this alternative architecture suitable for Quadrature Phase Shift Keying (QPSK) and multi-amplitude QPSK both with and without additional PPM.

Thus, many different signal modulation methods may be received and demodulated by the present invention. Ultrawideband (UWB) pulse modulation techniques enable a single representative data symbol to represent a plurality of binary digits, or bits. This has an advantage of increasing the data rate in a communications system. A few examples of modulation include Pulse Width Modulation (PWM), Pulse Amplitude Modulation (PAM), and Pulse Position Modulation (PPM). In PWM, a series of predefined UWB pulse widths are used to represent different sets of bits. For example, in a system employing 8 different UWB pulse widths, each symbol could represent one of 8 combinations. This symbol would carry 3 bits of information. In PAM, predefined UWB pulse amplitudes are used to represent different sets of bits. A system employing PAM16 would have 16 predefined UWB pulse amplitudes. This system would be able to carry 4 bits of information per symbol. In a PPM system, predefined positions within a UWB pulse timeslot are used to carry a set of bits. A system employing PPM16 would be capable of carrying 4 bits of information per symbol.

Additional UWB pulse modulation techniques may include: Coded Recurrence Modulation (CRM); Sloped Amplitude Modulation (SLAM); ternary modulation; 1-pulse modulation; and other UWB pulse modulation methods.

For example, in some conventional ultra-wideband (UWB) modulation techniques, a doublet or wavelet "chip" is modulated by a data signal. The data signal imparts a phase to the chip. A "doublet" or "wavelet" in some instances is a positive UWB pulse followed by a negative UWB pulse, or vice-versa. The two UWB pulses include a single chip, which is the smallest element of data in a modulated signal. In this case, the chip, comprising the two UWB pulses, represents a single bit of data (a 1 or a 0). If the data bit being sent is a 0, the chip may start with a positive UWB pulse and end with a negative UWB pulse, and if the data bit being sent is a 1, the chip may start with a negative UWB pulse and end with a positive UWB pulse. For example, in a bi-phasic or antipodal system, the two-pulse "wavelet" or "doublet" or its inverse (180° phase shift) represents a 1 or a 0. Other phase shifts may also be used such as 0°, 90°, 180°, and 270° shifts to develop quad-phasic systems. One element common to these modulation techniques, however, is that a 0 or 1 is represented by at least a positive and a negative pulse of energy. In the bi-phasic or antipodal system described above, a 0 is represented by two pulses of energy—a positive pulse and a negative pulse (or vice-versa). Thus, conventional modulation techniques use energy in the form of at least two UWB pulses having a specific phase (positive or negative) to send each data bit. This type of modulation may be received and demodulated by the present invention.

Another signal modulation method that may be demodulated by the present invention includes transmitting at least one data symbol with every UWB pulse. The data symbol may represent one or more binary digits, or bits.

Figure 16:
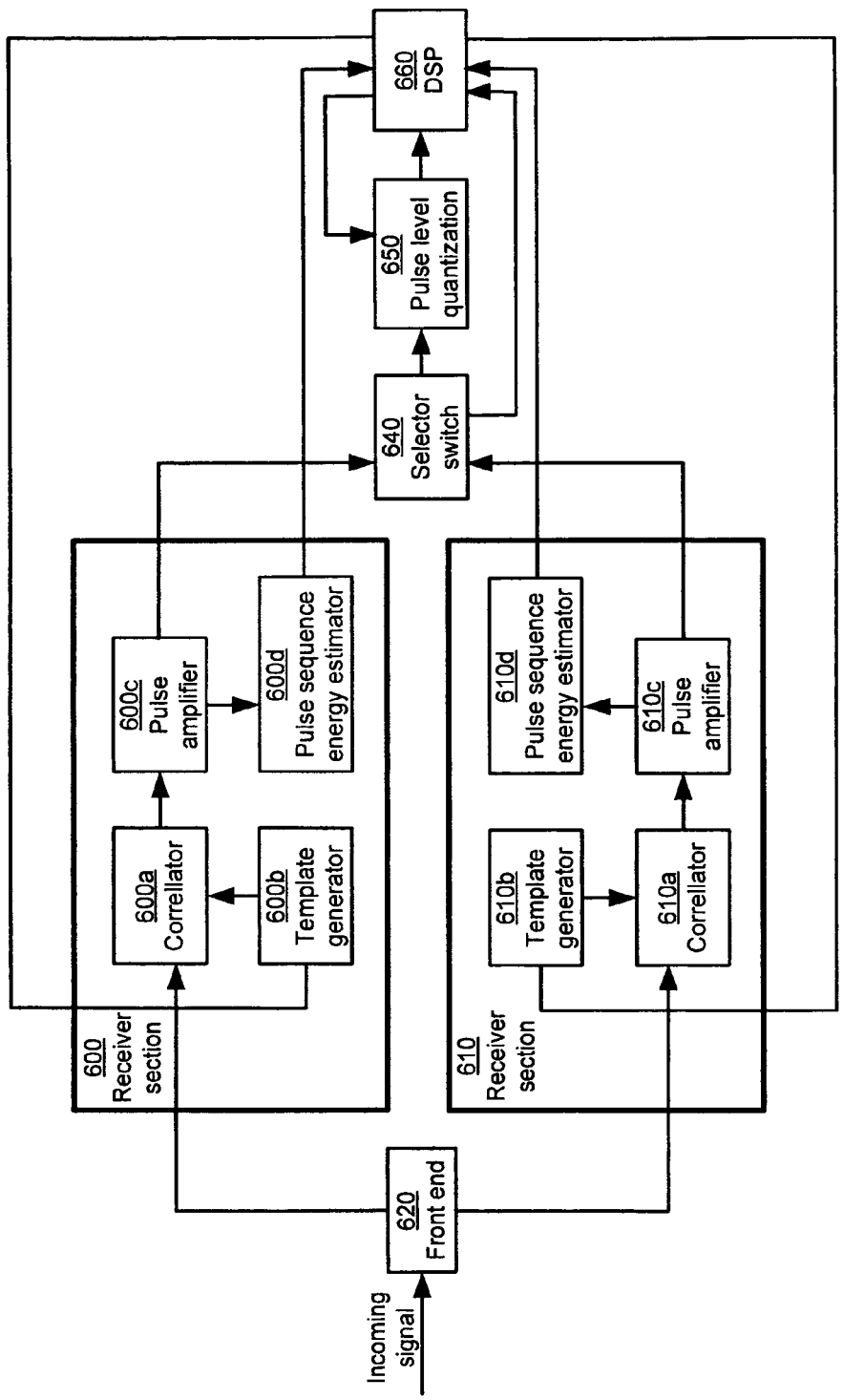
FIG. 16 illustrates another embodiment of a correlating receiver structured to operate in a multi-path environment.

Referring to FIG. 16, in cases when multi-path propagation, or interference conditions are an issue, a "ping-pong" signal acquisition method may be employed. In this method, two equivalent receiver sections 600, 610 are utilized. These sections consist of corellators 600*a*, 610*a*, template generators 600*b*, 610*b*, pulse amplifiers 600*c*, 610*c*, and pulse sequence energy estimators 600*d*, 610*d*. Common radio frequency (RF) front end 620 amplifies, and band-limits the incoming UWB pulse, or signal. The signal is then passed to receiver sections 600, 610 where it is processed and amplified. In this method, one receiver section (either 600 or 610) is in "search" mode, looking for a best possible correlation as described earlier. In this mode, the other receiver section (either 600 or 610) has its correlation signal fixed at a particular position within the modulation symbol slot and only the fine tuning signal is active. Selector switch 640 passes the signal from one of the sections 600, 610, to the pulse level quantization block 650. A DSP 660 processes the signal further. Preferably, at the same time, the DSP 660 is performing a pulse acquisition process in receiver section 600 searching for a pulse, or signal propagation path. If the signal level from the pulse sequence energy estimator 600*d* exceeds the signal level from the pulse sequence energy estimator 610*d*, the DSP 660 will switch selector switch 640 so the signal from receiver section 600 will be routed to pulse level quantization block 650. At the same time, DSP 660 starts an acquisition process in receiver section 610, searching for the new best pulse, or signal propagation path. This methodology assures that either receiver 600 or 610 will always be tuned to the best propagation "path."

Thus, it is seen that an apparatus for receiving ultra-wideband signals is provided. The present invention is suitable for both wireless and wire communications media. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent. Many designs other than the above-described embodiments will fall within the literal and/or legal scope of the instant disclosure, and the present invention is limited only by the instant disclosure. It is noted that various equivalents for the particular embodiments discussed in this description may practice the invention as well.

What is claimed is:

1. An ultra-wideband pulse receiver, comprising:
   two receivers structured to receive an incoming ultra-wideband pulse;
   a selector switch structured to selectively receive a signal from either of the two receivers;
   a pulse level quantizer structured to receive a signal from the selector switch; and
   a digital signal processor structured to receive the signal from the pulse level quantizer;
   wherein the digital signal processor compares a signal level received by each of the two receivers, and selects a highest signal level for forwarding to the pulse level qantizer.

* * * * *